United States Patent [19]

Murayama et al.

[11] 4,326,597
[45] Apr. 27, 1982

[54] AGRICULTURAL TRACTOR

[75] Inventors: Yoshinobu Murayama; Takashi Yoshii, both of Sakai, Japan

[73] Assignee: Kubota, Ltd., Osaka, Japan

[21] Appl. No.: 256,174

[22] Filed: Apr. 21, 1981

Related U.S. Application Data

[63] Continuation of Ser. No. 29,429, Apr. 12, 1979, abandoned.

[30] Foreign Application Priority Data

Aug. 31, 1978 [JP] Japan .................................. 53/107849

[51] Int. Cl.³ .......................... B60K 17/08; F16H 3/20
[52] U.S. Cl. .................................. 180/70 MS; 74/745; 180/53 CD
[58] Field of Search ........... 180/70 R, 70 MS, 53 CO; 74/745, 15.4, 15.66, 15.86

[56] References Cited

U.S. PATENT DOCUMENTS

| | | | |
|---|---|---|---|
| 1,417,950 | 5/1922 | Smalley | 180/70 MS |
| 2,072,380 | 3/1937 | Pfeiffer et al. | 180/70 R |
| 2,241,002 | 5/1941 | Peterson | 180/70 MS |
| 2,860,522 | 11/1958 | Howlett | 74/745 |
| 2,898,768 | 8/1959 | Wells | 180/53 CD |
| 2,914,966 | 12/1959 | Arnold | 74/745 |
| 3,645,153 | 2/1972 | Northcraft | 180/70 |
| 4,273,001 | 6/1981 | Miyahara et al. | 74/15.4 |

*Primary Examiner*—Joseph F. Peters, Jr.
*Assistant Examiner*—Donn McGiehan
*Attorney, Agent, or Firm*—Edwin E. Greigg

[57] ABSTRACT

An agricultural tractor comprising differential case, a transmission case, a speed change case interposed between the two cases and directly coupled thereto, and a speed change mechanism contained in the speed change case and adapted to provide a great reduction ratio. The speed change case is not integral with the two other cases.

5 Claims, 7 Drawing Figures

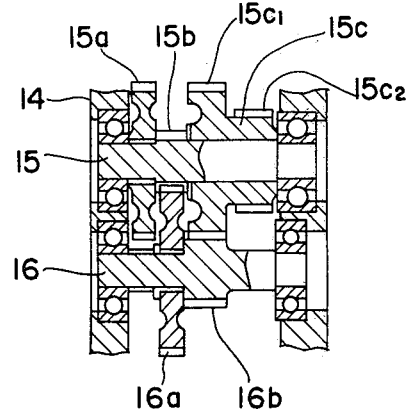
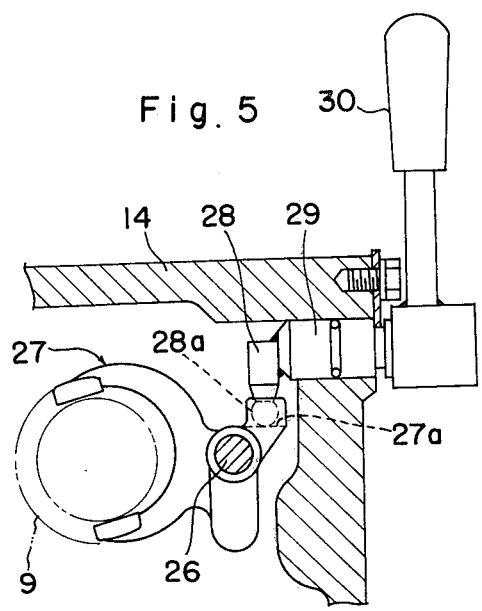
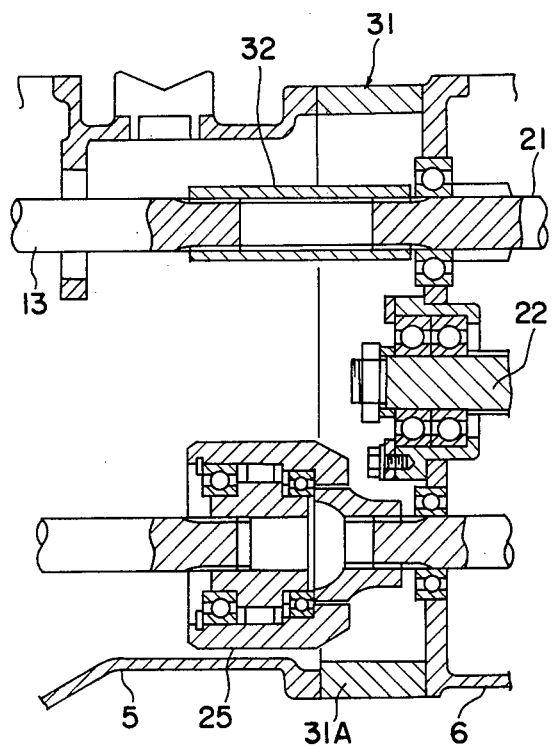
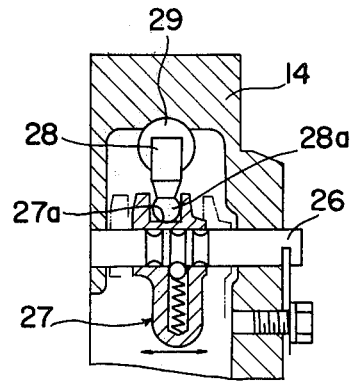

AGRICULTURAL TRACTOR

This is a continuation of application Ser. No. 29,429, filed Apr. 12, 1979, abandoned.

BACKGROUND OF THE INVENTION

This invention relates to agricultural tractors.

The traveling speed of the agricultural tractor has to be adjusted to different ranges depending on the load received at a ground engaging implement attached thereto. Where an ordinary rotary plow is attached to engage the ground and the load is relatively small, the tractor may travel at a relatively high speed for efficiency of operation. Where a trencher or the like is attached for deep plowing which causes a great load, the tractor needs to travel at a considerably slow speed compared with the case of an ordinary rotary plow. To enable the tractor to be operable for both, the transmission system leading from the engine to drive wheels must include a speed change mechanism adapted to provide a reduction ratio far greater than a maximum reduction ratio provided by a speed change mechanism capable of ordinary range reductions. If the tractor is integrally provided with such a speed change mechanism, the whole tractor construction will become large and very costly. Therefore, in conventional practice tractors intended specially for slow travelling and having a different construction from ordinary tractors are manufactured. It involves manufacture of a speed change mechanism adapted to provide a reduction ratio for low speed range in a separate process from manufacturing a speed change mechanism for the ordinary tractor; the two speed change mechanisms generally have very different constructions. Besides a transmission case different from the type for the ordinary tractor is manufactured, then the speed change mechanism for slow traveling is fitted in the transmission case, and finally they are are assembled with other components. Thus, the two types of tractors require entirely separate production lines at least for manufacture of the speed change mechanism and the transmission case, and for placing the speed change mechanism in the transmission case. This has the disadvantage of poor productivity and high manufacturing cost as a whole.

SUMMARY OF THE INVENTION

In view of the above situation, this invention has an object, in providing a type of tractor capable of a greater reduction ratio than the ordinary tractor, to facilitate change of arrangement between the two types of tractors, namely to provide a maximum common production line for the two tractors, thereby to achieve a higher productivity and reduction of manufacturing cost as a whole.

To this end an agricultural tractor according to this invention comprises a differential case containing a differential mechanism, a transmission case containing a speed change mechanism, a speed change case not integral with the differential case or the transmission case and interposed between and directly coupled to the differential case and the transmission case, and a speed change mechanism contained in the speed change case and adapted to provide a greater reduction ratio than a maximum reduction ratio provided by the speed change mechanism.

In manufacture of a tractor adapted for ultra-slow traveling according to this invention, all the components but the speed change mechanism and the case therefor can be manufactured and assembled through processes common with manufacturing of the ordinary tractor, whereby compared with the conventional practice as noted in the introduction the productivity has been greatly improved and the manufacturing cost reduced.

Other objects and advantages of this invention will be apparent from the following description.

BRIEF DESCRIPTION OF THE DRAWINGS

In the drawings illustrating an agricultural tractor according to the invention;

FIG. 4 is a plan view in cross section of the speed change case,

FIG. 5 is a rear view in vertical section of a part of the speed change case,

FIG. 6 is a side view in vertical section corresponding to FIG. 5, and

FIG. 7 is a side view in vertical section showing a modified arrangement.

DETAILED DESCRIPTION OF THE PREFERRED EMBODIMENTS

Figure 1:
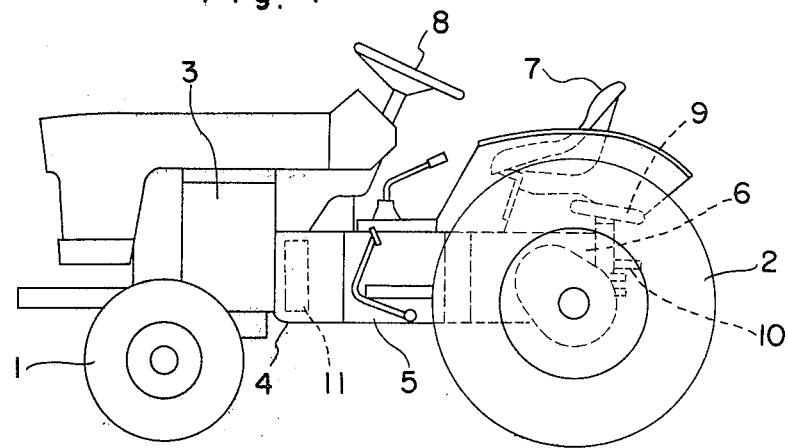
FIG. 1 is a side elevation of the tractor.

FIG. 1 schematically shows a side view of an agricultural tractor. This tractor comprises a pair of front wheels 1, a pair of rear wheels 2, an engine 3 mounted forwardly, a clutch case 4 directly connected to the engine 3, a tubular transmission case 5 coupled to the clutch case 4 and forming part of the tractor frame, a differential case 6 coupled to the transmission case 5 and adapted for differential drive of the rear wheels 2, a driver's seat 7 mounted on the differential case 6, a steering wheel 8, lift arms 9 vertically oscillatably pivoted to the differential case 6 to raise and lower an attached implement by means of hydraulic power, and a power takeoff shaft 10 (described later).

Arrangements for power transmission to the rear wheels 2 and to the power takeoff shaft 10 are described next.

Numeral 12 indicates an input shaft extending into the transmission case 5 by way of a friction type clutch 11 contained in the clutch case 4. The transmission case 5 supports a first travel shaft 13 and a first power takeoff shaft 24 parallel to the input shaft 12. The input shaft 12 carries three gears 12a, 12b and 12c mounted for integral rotation with the shaft 12. The gears 12a, 12b and 12c are arranged in this order from front to rear. The first travel shaft 13 carries a freely rotatable gear 13a, two integrally rotatable shift gears 13b and 13c, and a further freely rotatable gear 13d arranged in this order from front to rear. The freely rotatable gear 13a is in constant mesh with a gear 13a' rotatably fitted on the shaft 13 and is adapted to move into and out of mesh with gear 12a on the input shaft 12. The small diameter shift gear 13b and the large diameter shift gear 13c are adapted to move into and out of mesh with the large diameter gear 12b and the small diameter gear 12c on the input shaft 12 respectively. The small diameter shift gear 13b is adapted to be meshable with the rotatably fitted gear 13a' in the same manner as mentioned above. The freely rotatable gear 13d is in constant mesh with a gear 13d' rotatably fitted on the shaft 13 and with a spline 12d defined on the input shaft 12. The large diameter shift gear 13c is adapted to move into and out of mesh with the rotatably fitted gear 13d'. Therefore, the shaft 13 is subjected to speed changes by shifting the two shift gears 13b and 13c independently. The foregoing arrangements make up a main traveling speed change mechanism A.

Figure 3:
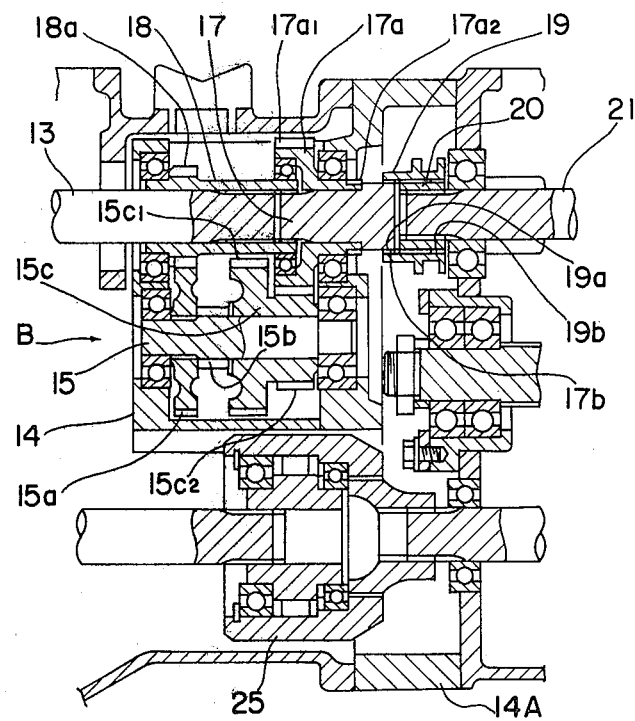
FIG. 3 is a side view in vertical section of a speed change case.
Figure 2:
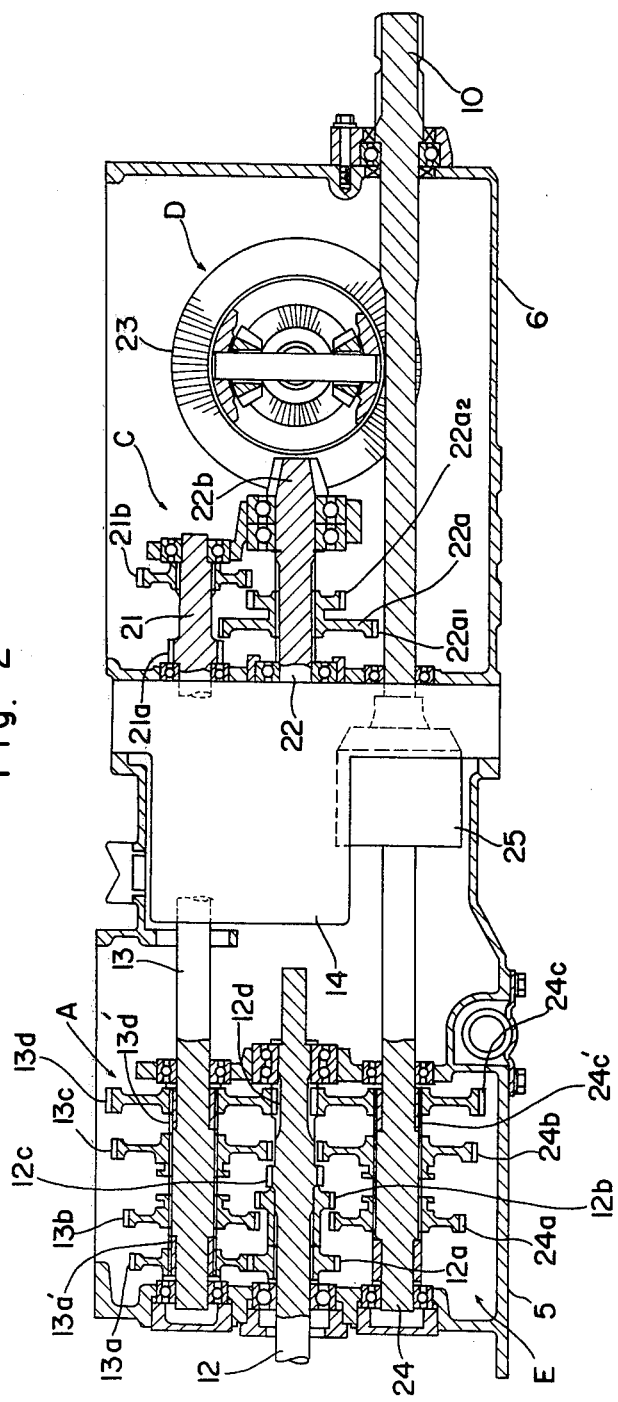
FIG. 2 is a side view in vertical section of a principal portion.

Numeral 14 indicates a speed change case for super reduction disposed between and coupled to the transmission case 5 and the differential case 6. The speed change case 14 contains a speed change mechanism B for a low speed range, which is arranged as shown in FIGS. 3 and 4. The speed change mechanism B includes a first shaft 15, a second shaft 16 and a third shaft 17 supported parallel to one another. The first shaft 15 fixedly carries a gear 15a to mesh with a gear portion 18a of a tubular member 18 splined to extend from a rearward end of the first travel shaft 13 to a forward end of the third shaft 17. The first shaft 15 further carries fixed thereon a gear 15b having a smaller diameter than the gear 15a, and the second shaft 16 carries fixed thereon a gear 16a in mesh with the gear 15b. The second shaft 16 further carries a small diameter gear 16b fixed thereon, and the first shaft 15 carries rotatably fitted thereon a tubular member 15c including a gear portion $15c_1$ having a greater diameter than the gear 16b and meshing therewith. The third shaft 17 carries rotatably fitted thereon a tubular member 17a including a gear portion $17a_1$ having a greater diameter than a small diameter gear portion $15c_2$ of the tubular member 15c. A transmission gear 19 is mounted to extend from a small diameter gear portion $17a_2$ of the tubular member 17a to a peripherally and internally toothed gear 20 fitted on a spline defined on a protruding forward end of a second travel shaft 21 supported by the differential case 6.

Accordingly, the rotation of the first travel shaft 13 is transmitted at a greatly reduced ratio to the second travel shaft 21 through the transmission mechanism B for low speed.

The differential case 6 contains a third travel shaft 22 parallel to the second travel shaft 21 and a differential mechanism D having an axis normal to the shafts 21 and 22. There is an auxiliary speed change mechanism C provided between the two shafts 21 and 22. That is, the third shaft 22 is splined with a shift gear 22a having a large diameter gear portion $22a_1$ and a small diameter gear portion $22a_2$ adapted to mesh with a small diameter gear 21a and a large diameter gear 21b fixed on the second shaft 21 respectively. A small diameter bevel gear 22b mounted on the rearward end of the third shaft 22 is in mesh with a follower large diameter bevel gear 23 of the differential mechanism D which is of course interlocked with the rear wheels 2.

Referring now to a transmission arrangement for the power takeoff shaft 10, the first power takeoff shaft 24 carries a small diameter shift gear 24a and a large diameter shift gear 24b splined thereon, and a rotatably fitted gear 24 on which a freely rotatable gear 24c is splined. The small diameter gear 24a and the large diameter gear 24b are adapted to move into and out of mesh with the large diameter gear 12b and the small diameter gear 12c on the input shaft 12 respectively. The rotatable gear 24 is in mesh with a rotatably fitted gear 24c' which is in constant mesh with a spline on the input shaft 12. The large diameter gear 24b is adapted to move into and out of mesh with the rotatably fitted gear 24c'. These arrangements make up a power takeoff speed change mechanism E. The power takeoff shaft 10 is mounted in the differential case 6 to be coaxial with the first shaft 24, and the power takeoff shaft 10 and the first shaft 24 are interlocked through a unidirectional clutch 25.

The transmission gear 19 has gear portions 19a and 19b respectively at forward and rearward ends thereof, the inner periphery being cut out at an intermediate portion, and is adapted to shift in axial directions. The gear 19 is engaged by a shift fork 27 fitted to be slidable only in axial directions on a cross bar 26 mounted in the speed change case 14 parallel to the axis of the gear 19. The speed change case 14 supports a cross bar 29 carrying an element 28 with a spherical portion 28a adapted to engage a groove 27a defined on a free end of the shift fork 27. A portion of the cross bar 29 protruding from the case 14 carries a hand lever 30 fixed thereon. An oscillation of the lever 30 causes the shift fork 27 to slide and thereby shift the gear 19. By this shifting, the gear 19 assumes for example a rearward position whereby the forward gear portion 19a meshes with the small diameter gear portion 17b of the third shaft 17 and the rearward gear portion 19b meshes with the peripherally and internally toothed gear 20. Shifting of gear 19 also causes the first travel shaft 13 and the speed change mechanism B for low speed to be disconnected, and the first shaft 13 and the second shaft 21 to be directly coupled, whereby a normal travelling speed range is provided as well. It should be noted that this invention may be embodied that the gear 19 is a fixed type wherby the first shaft 13 is coupled to the second shaft 21 through the speed change mechanism B at all times.

As shown in FIG. 7, this invention provides that the speed change case 14 is removed with the speed change mechanism B contained therein and instead a spacer case 31 having an outer wall 31A equal or about equal in shape and size to an outer wall 14A of a large diameter portion of the speed change case 14 is placed between and directly coupled to the transmission case 5 and the differential case 6. In this case the first travel shaft 13 is directly coupled to the second shaft 21 by means of a coupling 32.

The tractor with the former arrangement for low speed can travel at a greater reduction ratio than a maximum reduction ratio at which the tractor with the latter, ordinary arrangement travels. The length of the tractor is invariable whichever arrangement is provided. The two types of the tractors are different only in the speed change mechanism B, the speed change case 14 and the spacer case 31, the other components such as the speed change mechanisms A, C and E, the differential mechanism D, the transmission case 5 and the differential case 6 being all the same.

It is to be understood that in the ordinary arrangement the spacer case 31 may be dispensed with by directly coupling the transmission case 5 and the differential case 6.

We claim:

1. An agricultural tractor including an engine and comprising a transmission casing, said transmission casing including a forward portion and a rearward portion; a main speed change mechanism disposed in said forward portion of said transmission casing; said main speed change mechanism including an input shaft adapted to receive power from said engine; a plurality of gears mounted on said input shaft; a first output travel shaft parallel with said input shaft; a plurality of axially movable gears mounted on said first output travel shaft movable relative to said input shaft to provide plural speeds; a differential casing coupled to the rearward portion of said transmission casing; a speed change casing secured in the rearward portion of said transmission casing between said forward portion of said transmission casing and said differential casing; a low range speed mechanism in said speed change casing adapted to receive power from said first output travel shaft, said low range speed change mechanism including a plurality of gears related to each other which provide a greater reduction ratio than a maximum reduction ratio provided by said main speed change mechanism; said differential casing including therein an auxiliary speed change mechanism and a differential mechanism; said auxiliary speed change mechanism including a second travel shaft; said second travel shaft protruding into said speed change casing and connecting with said low range speed mechanism to transmit power from said low range speed mechanism through a third travel shaft to said differential mechanism.

2. An agricultural tractor as claimed in claim 1, wherein said speed change casing having said low range speed change mechanism is detachable from said transmission casing and said differential casing.

3. An agricultural tractor as claimed in claim 1, wherein said first output travel shaft is arranged coaxial with and spaced from said second travel shaft, and said low range speed change mechanism includes a third shaft mounted between said first output travel shaft and said second travel shaft.

4. An agricultural tractor as claimed in claim 3, wherein said third shaft is coupled to said first output travel shaft for unitary rotation therewith, a freely rotatable tubular member carried by said third shaft, a final gear integral with said freely rotatable tubular member of said low range speed change mechanism, a switch mechanism carried at an end of said second travel shaft, said switch mechanism comprising an axially shiftable transmission gear to selectively connect said third shaft or said tubular member to said auxiliary speed change mechanism.

5. An agricultural tractor as claimed in claim 4, wherein said low range speed change mechanism further comprises:

a second tubular member splined to a rearward end of said first output travel shaft;

a first gear on said second tubular member;

a first shaft and a second shaft supported parallel to said third shaft;

said first shaft carrying a second gear which meshes with said first gear and a third gear rotatable in unison with said second gear, said second shaft carrying a fourth gear to mesh with said third gear and a fifth gear rotatable in unison with said fourth gear; and a sixth gear and a seventh gear mounted on said first shaft and rotatable in unison with each other, said sixth gear being in mesh with said fifth gear, and said seventh gear being in mesh with said final gear.

* * * * *